June 21, 1932. E. J. LEES 1,863,570
MACHINE FOR CUTTING THREADS AND CUTTING TEETH IN BODIES
Original Filed Feb. 22, 1924   7 Sheets-Sheet 2

June 21, 1932.  E. J. LEES  1,863,570
MACHINE FOR CUTTING THREADS AND CUTTING TEETH IN BODIES
Original Filed Feb. 22, 1924  7 Sheets-Sheet 4

Inventor
Ernest J. Lees
Geo. B. Pitts
Attorney

June 21, 1932.  E. J. LEES  1,863,570

MACHINE FOR CUTTING THREADS AND CUTTING TEETH IN BODIES

Original Filed Feb. 22, 1924   7 Sheets-Sheet 7

Patented June 21, 1932

1,863,570

UNITED STATES PATENT OFFICE

ERNEST J. LEES, OF CLEVELAND, OHIO, ASSIGNOR TO THE LEES-BRADNER COMPANY, OF CLEVELAND, OHIO, A CORPORATION OF OHIO

MACHINE FOR CUTTING THREADS AND CUTTING TEETH IN BODIES

Application filed February 22, 1924, Serial No. 694,452. Renewed November 11, 1929.

This invention relates to machines for cutting or milling the teeth of cutters, dies, etc., particularly those having reliefs, and for cutting threads on bodies, the surfaces to be threaded of which—whether external or internal—are tapered or of conical shape, such as plugs, bushings and the like.

One object of the invention is to provide a machine of this character of relatively simple construction and capable of being operated rapidly and economically.

Another object of the invention is to provide a machine of this character having improved means for guiding and feeding or controlling the tool to properly cut teeth on cutters, dies, etc., with reliefs, or to cut threads on external or internal tapered or conical surfaces.

A further object of the invention is to provide a machine of this character having improved means for guiding or controlling the tool, adaptable to cutting tapered plugs, cutters, hobs, bushings, dies, etc., of any predetermined taper.

Other objects of the invention will be apparent to those skilled in the art to which my invention relates from the following description taken in connection with the accompanying drawings, wherein.

In the drawings, 1 indicates a frame of any suitable size and construction. 2 indicates a standard or upright member supporting spaced bearings 3, 3, for a spindle 4. The inner end of the spindle 4 is shaped to receive a collet 5, preferably connected to a rod 6 extending through an axial opening in the spindle 4 to the rear end of the latter. The rear end of the rod 6 has screw-threaded connection with the spindle opening to provide means for moving the rod endwise to move the clamping elements of the collet into clamping engagement with the shank 7 of a work piece such as a cutter or body 8, in which teeth or threads are to be cut; or for releasing the shank 7 to permit its removal. A nut 6' may engage the extended end of the rod 6 to lock it in clamping position. The free or outer end of the rod 6 is shaped to receive a suitable tool, whereby it may be rotated.

9 indicates a gear fixed to the spindle 4 and meshing with a pinion 10. The pinion 10 is fixed to a driven shaft 11 mounted in suitable bearings 11a in the standard or upright member 2. The outer end of the shaft 11 carries a pulley 11b for a belt, whereby the shaft 11 and spindle 4 are driven.

Figure 2:
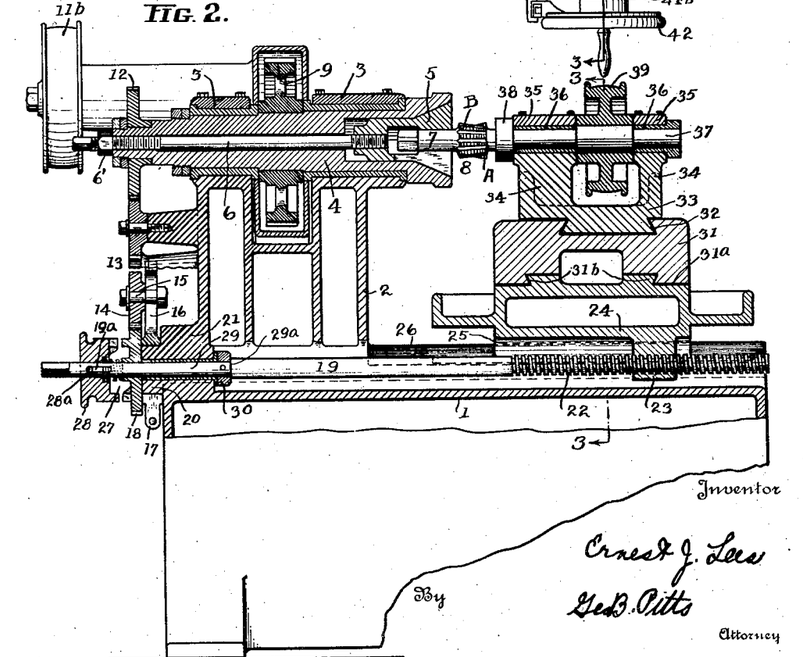
Fig. 2 is a longitudinal section on the line 2—2 of Fig. 1.

At or near its outer end the spindle 4 carries a removable gear 12, which constitutes one element of a gear train 13, each gear of which is removably mounted on a suitable stud shaft supported in the end wall of the standard or upright member 2. The gear train 13 also includes a gear 14 removably mounted on a stud shaft 15, which in turn is adjustable endwise of a slot 16 formed in an arm 17, and a gear 18 adapted to be connected to a shaft 19, to which reference will later be made. The arm 17 is swingably mounted on a boss 20, projecting from the frame 1 (see Fig. 2) and disposed concentric to the shaft 19, which arrangement permits the gear 14 to be adjusted about the axis of the gear 18. From the foregoing description it will be seen that each of the gears of the gear train 13 may be removed or changed and others substituted to provide any desired speed ratio between the spindle 4 and shaft 19. The shaft 19 extends longitudinally of the frame 1 and is mounted in suitable bearings—only one of which is shown at 21 (Fig. 2). A portion of the shaft 19 is provided with threads 22 which engage a nut 23, depending from a slide 24, whereby the latter is moved or fed longitudinally of the frame 1 when the shaft 19 is driven, to give the tool A lead movement relative to the work B. The slide 24 is provided with suitable guides 25 which engage ways 26 on the frame. 24a, 24a', indicate a pair of spaced arms extending laterally from the rear side of the main slide 24 and respectively provided with aligned bearings 69 and 69' to receive and rotatably support a shaft 24' extending longitudinally of the bed 1, and which also has bearings 47a and 47b at its extreme ends. The purpose of the shaft 24' will be later set forth.

The connection between the gear 18 and shaft 19 preferably comprises a clutch 27, one set of jaw elements being provided on the outer face of the gear 18 and the other set of jaw elements being provided on a collar 28, slidably fitting the shaft 19. The collar 28 is keyed to the shaft 19 by a pin 28a extending through an elongated slot 19a formed in the shaft, which slot permits the collar to be moved endwise of the slot to cause engagement between the sets of clutch jaw elements or their disengagement, whereby the shaft 19 may be driven or not, as desired. The collar 28 may be operated in either direction by any suitable means (not shown) to effect the engagement and disengagement of the clutch jaw elements.

At 29, the shaft 19 is reduced to form a shoulder 29a against which abuts a collar 30 serving to engage the end of the bearing 21 to take the end thrust of the shaft 19. The outer end of the shaft 19 is preferably squared to take a suitable tool, whereby the shaft may be manually rotated to adjust the slide 24, for well known reasons.

31 indicates a supplemental slide having guides 31a engaging ways 31b provided on the slide 24. As shown in Fig. 2, the ways 31b extend transversely of the machine to permit movement of the supplemental slide 31 transversely for reasons which will later appear.

The supplemental slide 31 is provided on its upper surface with longitudinally extending ways 32 to slidably support and guide an auxiliary slide 33, which is movable longitudinally of the supplemental slide 31 to permit its adjustment, as will presently be set forth.

34 indicates a pair of standards, on the auxiliary slide, forming pillow blocks having caps 35 which support suitable spaced bearings 36 for a shaft 37. At its inner end, the shaft 37 carries a socket or suitable collet 38 having clamping elements to engage and removably support the shank of the tool A. Between the bearings 36 the shaft 37 is enlarged to form shoulders which abut the inner or opposing ends of the bearings 36 to prevent endwise movement of the shaft. 39 indicates a driving element, such as a belt pulley, which may be mounted on and secured to the enlarged section of the shaft 37. In the form of construction illustrated the pulley 39 is driven from a separate source of power independent of the driving means for the work carrying spindle or shaft and feed shaft 19.

The auxiliary slide 33 is movable transversely of the machine for the purpose of adjusting the tool A relative to the work B, such adjustment being preferably effected by the following instrumentalities: at one end, the supplemental slide 31 has an upstanding wall 31' formed with an opening 40, which rotatably supports a nut 41. The inner end of the nut 41 is provided with a collar 41a, which engages the adjacent surface of the wall 31' to prevent endwise movement of the nut in one direction and its outer end has fixed to it a dial plate 41b which engages the adjacent surface of the wall to prevent endwise movement of the nut in the other direction. 42 indicates a hand wheel connected with the nut in any desired manner for rotating it in opposite directions. The dial plate 41b may be provided with graduations which co-operate with a fixed point on the adjacent surface of the wall 31' to indicate the rotative adjustment of the dial plate 41b. 43 indicates a screw fitting the nut, as shown in Fig. 3, and fixed at its inner end to the auxiliary slide 33 in any desired manner, so that when the nut is rotated the slide 33 is moved or adjusted in its guides to the desired extent to effect proper working relationship between the tool A and work B.

44 indicates as an entirety, means normally tending to move the supplemental slide 31 in its guide ways in one direction, namely, toward the right as viewed in Fig. 3, to maintain active co-operative engagement between control elements 45, 46, which will be later referred to.

Figure 3:
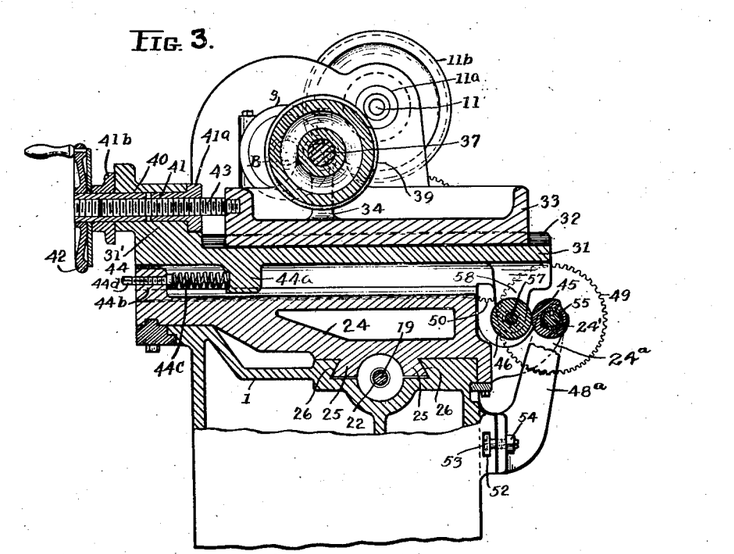
Fig. 3 is a section on the line 3—3 of Figs. 1 and 2.

Of the moving means 44, 44a indicates a thrust member depending from the slide 31, preferably disposed midway between its sides. 44b indicates an abutment comprising an upstanding lug integrally connected to the slide 24 and disposed in alignment with the thrust member 44a. 44c indicates a coiled spring interposed between and engaging at its opposite ends the opposing surfaces of the thrust member 44a and abutment 44b and acting thereagainst to move the slide 31 transversely of the frame toward the right as viewed in Fig. 3. The coiled spring 44c is of such size and strength that when the slide 31 is moved toward the left and the spring is compressed, the latter will react to tend to move the slide 31 in the opposite direction and to move it when free to so move, as will later be explained. To insure the required tension in the spring 44c, I preferably provide between its outer end and the abutment 44b an adjustable element 44d, whereby the spring 44c may be compressed to increase its tension if necessary. The adjustable element 44d preferably comprises a screw threaded rod fitting a screw threaded opening formed in and extending through the abutment 44b. The inner end of the rod is enlarged to form a head with which the outer end of the spring 44c engages; the outer end of the rod is squared to receive a suitable tool, whereby the rod may be rotated to move its head endwise to compress the spring 44c, as just described.

Figure 1:
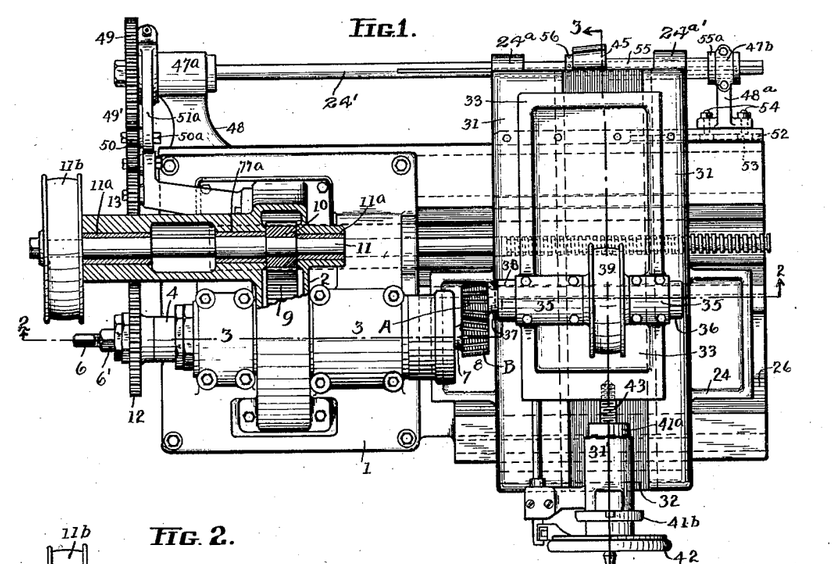
Fig. 1 is a plan view of a machine embodying my invention.
Figure 4:
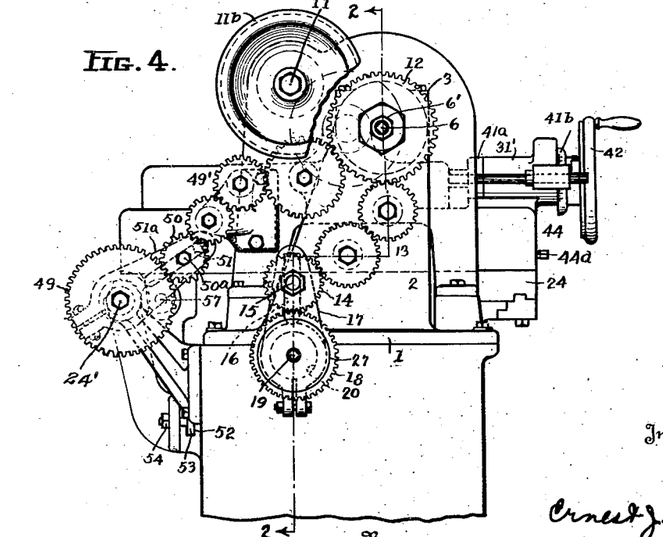
Fig. 4 is an end view of the machine.

At the left end of the frame as viewed in Figs. 1 and 2, the shaft 24' is mounted in a bearing 47a provided in a bracket 48, and, passing through the bearing, carriers on its free end a removable gear 49 which forms one element of a train 49' of removable or changeable gears driven by the gear 12 (see Fig. 4). The gear train 49' includes a gear 50, removably mounted on a stud shaft 50a, which in turn is adjustable endwise of a slot 51 formed in an arm 51a. The arm 51a is swingably mounted on a boss or collar projecting from the adjacent arm or bracket 48 and disposed concentric to the shaft 24' which arrangement permits the gear 50 to be adjusted about the axis of the gear 49 to a position dependent upon the size of the gears constituting the gear train 49', or to be thrown out of mesh with the adjacent driving gear, when, by reason of the nature of the work piece to be cut, it is not necessary to drive the shaft 24'. 48a indicates a bracket adjustably mounted on the frame 1 and arranged at a point beyond the slide 24 and at the opposite end of the shaft 24' from the gear 49. The purpose of the bracket will later appear. Adjustment of the bracket 48a in horizontal directions is provided for by the following elements: 52 indicates a T-slot formed in the side wall of the frame and extending in a horizontal direction parallel to the shaft, 24'—see Fig. 3. 53 indicates a pair of bolts having their heads disposed in said slot and extending through openings formed in the base portion of said bracket to take nuts 54, whereby the latter may be operated to adjustably secure the bracket in position.

55 indicates a sleeve surrounding the shaft 24' and splined to slide thereon longitudinally and rotate therewith. At its outer end the sleeve is provided with a grooved collar 55a which is rotatably supported by a bearing 47b carried by the adjustable bracket 48a. The bearing 47b comprises separable elements which fit in the groove of the collar 55a and thereby prevent endwise movement of the sleeve 55. On the inner end of the sleeve 55 is a control element 45 preferably of conical form co-axial with the sleeve 55 and shaft 24'. The sleeve is reduced to form a shoulder 55b and control element 45 is mounted thereon and clamped against the shoulder by a ring nut 56 on the end of the sleeve. The sleeve furthermore is splined on the shaft 24'. By this construction the sleeve 55 and control element 45 may be rotatably driven by the shaft 24' and may be adjustably positioned along the shaft axially by adjusting the position of the bracket 48a on the frame. In any adjusted position the grooved collar 55a prevents axial movement of the control element 45.

As before referred to, the shaft 24' runs in a bearing 69 in the arm 24a on the slide 24; and as will now appear the shaft 24' is supported in the sleeve 55 which in turn is rotatably supported in the bearing 69' in the other arm 24a' of the slide. Thus the shaft 24' and the control element 45 on the sleeve 55 are prevented from moving or yielding radially with respect to the arms 24a and 24a' and slide 24 when the control element 45 rolls in pressure engagement with a companion control element 46 which will now be described.

Figure 5:
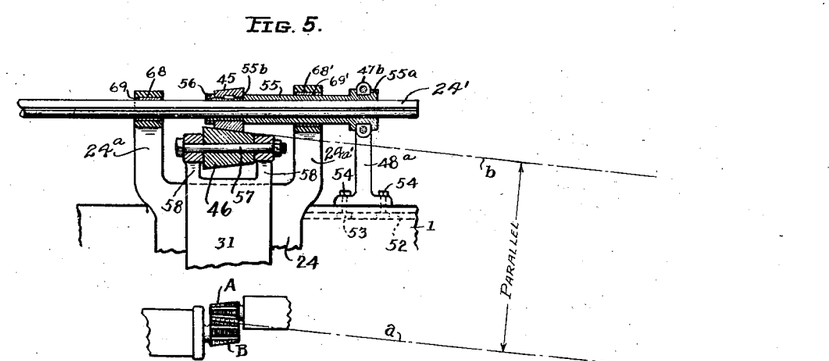
Fig. 5 is a fragmentary sectional view showing certain control elements which may be employed in the machine of Figs. 1 to 4 inclusive and showing a work piece and showing a tapered multi-ring type of cutting tool which may be controlled by the control elements.

Depending from the supplemental slide 31 as shown in Figs. 3 and 5, is a pair of arms 58—58 supporting a removable shaft 57 on which is rotatably mounted the control element 46. The control element 46 is preferably of conical form and mounted with its axis parallel to the axis of the control element 45 and of the same conical angle as the control element 45. As above described, the supplemental slide 31 is at all times spring pressed by the spring 44c (Fig. 3) in the direction toward the shaft 24'; and thus the control element 46 as will now be understood is at all times held resiliently against the control element 45. The conical control elements 45 and 46 contact with each other along a line such as $b$ Fig. 5 at an angle to the longitudinal direction of movement of the slide 24 on its ways 26, so that as the slide 24 is moved by the lead screw 19, the control element 46 will move in the direction of the line $b$ and force the supplemental slide 31 to move transversely on the slide 24; and the tool A supported on and movable with the slide 31 will also be given a movement in the direction of a line parallel to the line $b$, for example along the line $a$ in Fig. 5. The movement of the control element 46 axially over the control element 45 is combined of a rolling and sliding movement, the rotating control element 45 rotatably driving the control element 46 and the friction of one element moving on the other is thus reduced to a neglegible amount. Thus it will be seen that by providing control elements 45 and 46 having a line of contact $b$ parallel to the taper or conical side of the work piece, the supplemental slide 31 will be moved transversely by the control elements as the slide 24 moves longitudinally on the bed 1, and the tool A will follow a line such as $a$ parallel to $b$ and along the conical side of the work surface whether the latter be an internal or external surface.

It will be apparent that for work pieces of generally conical form, the control elements 45 and 46 must be of circular section but otherwise they may be variously formed and variously mounted with respect to each other, the only essential being that the line of contact of one with the other is parallel to the desired path of the tool on the work. Only conical elements have been shown in the drawings.

Figure 9:
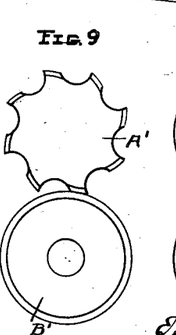
Fig. 9 is a diagrammatic view similar to Fig. 7 but showing a work-piece (other than a cutter) in which threads are to be cut in its external surface.
Figure 10:
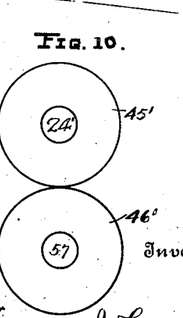
Fig. 10 is a view similar to Fig. 8 but showing the control elements used in cutting a work-piece such as shown in Fig. 9.

When the operation to be performed on the work is the cutting of continuous threads or the like such as threads on the body B' by the cutter A' in Fig. 9, the control elements may be circular in cross section as shown in Fig. 10. Such control elements will be employed with the arrangements shown in Figs. 11 to 17 inclusive. When, however, it is desired to perform an operation such as cutting tool teeth with reliefs, control elements such as illustrated in Fig. 8 may be employed. One of them, 46'', mounted on the shaft 57, may be circular in section, and the other, 45'', coaxial with the shaft 24', may be provided with a cam portion 45a. Upon each revolution of the control element 45'' the cam portion gives a supplemental reciprocatory transverse movement to the supplemental slide 31, the cam surface 45a reciprocating the slide in one direction and the spring 44c above described reciprocating it in the return direction. Thus a cutting tool A'' as illustrated in Fig. 7, having teeth of suitable shape for cutting tool teeth on the work piece B'' will be periodically fed into the work piece in a manner to vary the radial length of the teeth being cut to give them relief. The nature and purposes of relief are well understood in the metal cutting art. The invention as illustrated in Figs. 1 to 6 inclusive and 18 and 19 shows the cutting of tool teeth with relief.

As will be understood from the foregoing description, the shaft 24' may be rotated in harmony with the work shaft 4, so that the control element 45'' will be timed to effect periodical feeding of the tool into the work, to cut the reliefs.

Figure 6:
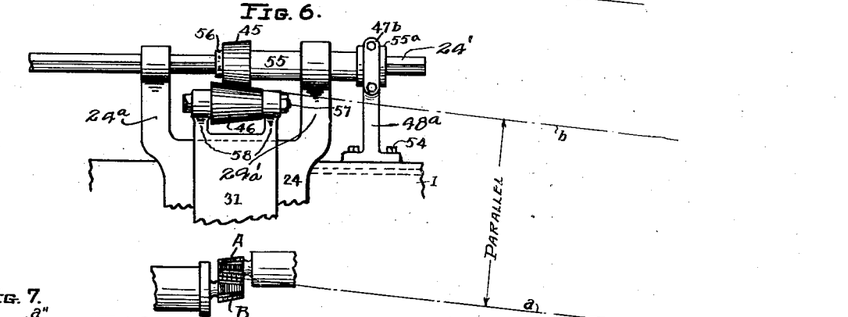
Fig. 6 is a plan view of the parts shown in Fig. 5.
Figures 7, 8:
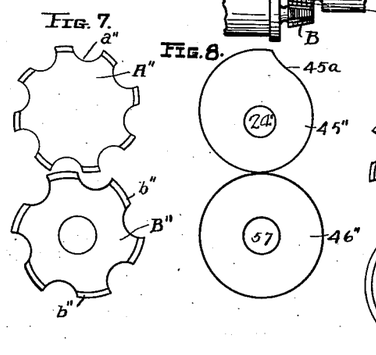
Fig. 7 is a diagrammatic view of the cutting tool and work-piece, the work-piece being a cutter having reliefs.
Fig. 8 is a diagrammatic view of the control elements used in the form of construction shown in Figs. 5 and 6 for controlling the tool shown in Fig. 7.

In Figs. 5 and 6 the tool A is conical and of the multi-ring type and the axis of the cutter spindle may be parallel to the axis of the work. The tool is shown cutting external teeth such as the teeth of a pipe threading tap on the work piece B.

Figure 16:
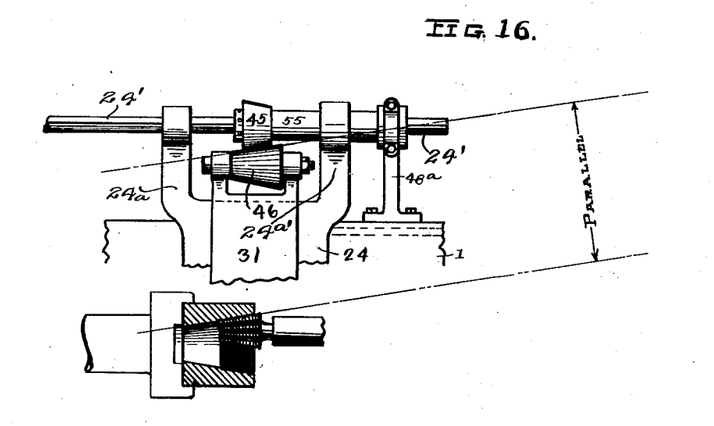
Fig. 16 is a view similar to Fig. 13, but showing the use of a tapered multi-ring type cutter.

In Fig. 16 a similar tool is employed cutting threads on the internal conical surface of a nipple or bushing.

Figure 11:
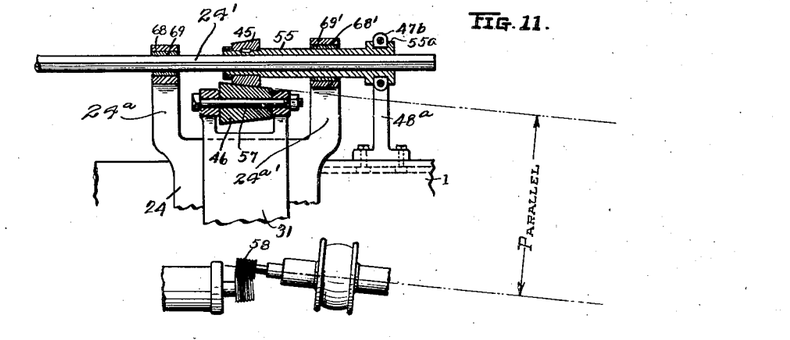
Fig. 11 is a view similar to Fig. 5, but showing the cutting of external threads on a tapered body by a cylindrical multi-ring type of cutter.
Figure 17:
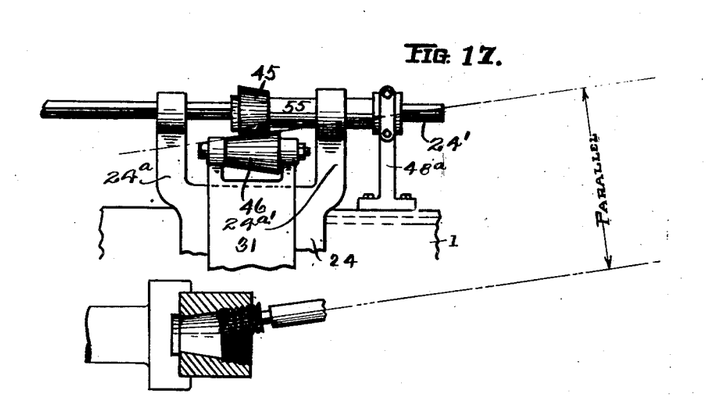
Fig. 17 is a view similar to Fig. 16, showing the use of a cylindrical multi-ring type of cutter.

In Figs. 11 and 17 a cylindrical multi-ring type of cutter is used for cutting conical threads on exterior and interior conical surfaces respectively. Here the axis of the tool is adjustably positioned parallel to the line of contact of the control elements.

Figure 12:
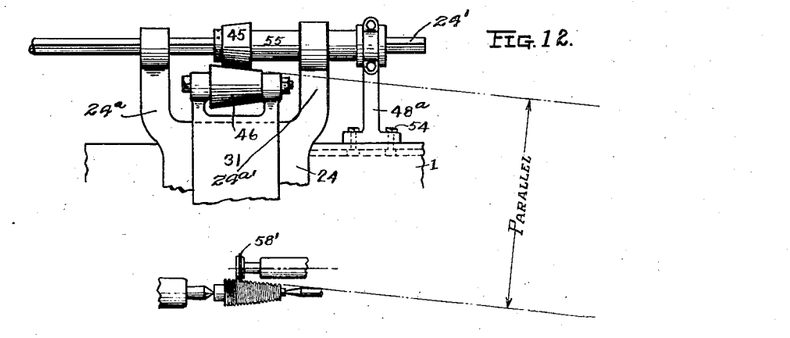
Fig. 12 is a view similar to Fig. 11, but being in plan and showing the use of a single ring type cutter.
Figure 13:
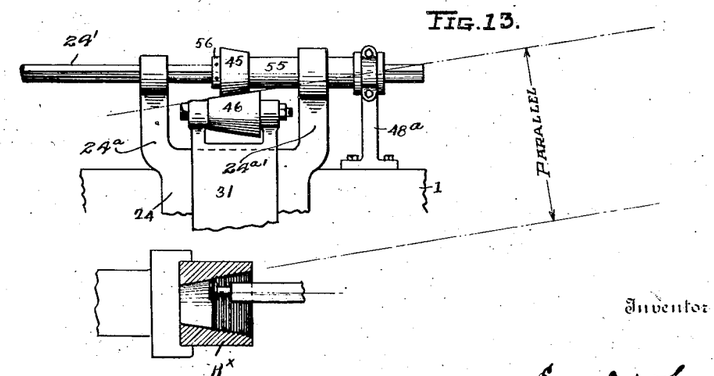
Fig. 13 is a view similar to Fig. 12 but showing the manner of cutting threads on the internal conical wall of a bushing by a single-ring type cutter.
Figure 14:
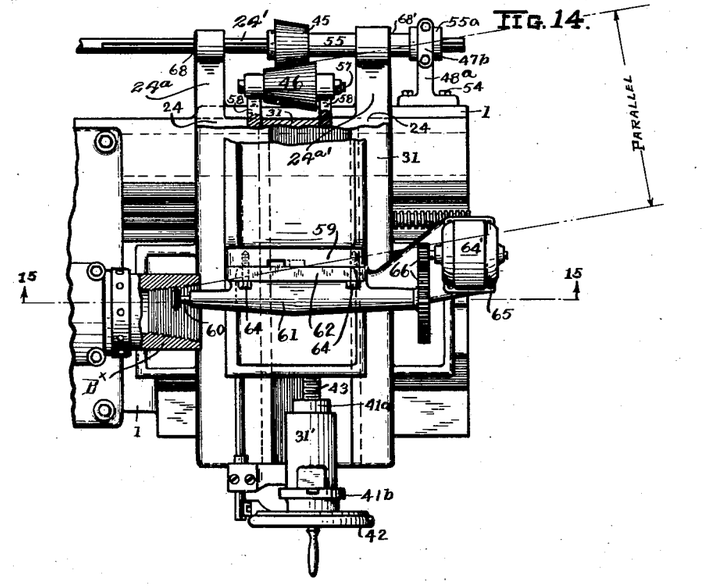
Fig. 14 is a fragmentary plan view of a machine (parts being broken away) showing the mounting of the cutter for cutting threads on the internal wall of a body with a single-ring type cutter.
Figure 15:
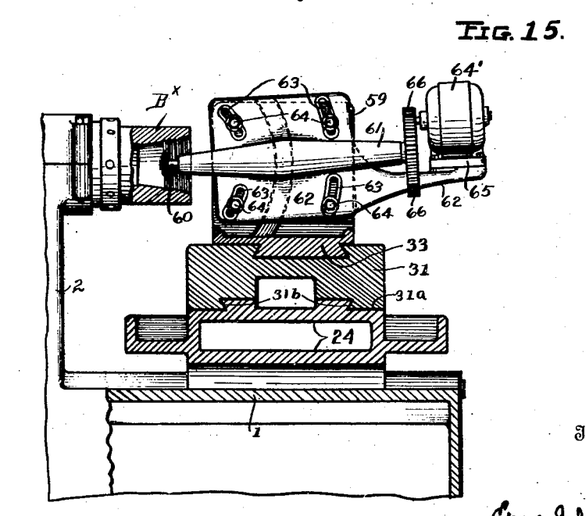
Fig. 15 is a section on the line 15—15 of Fig. 14.

In Fig. 12 a single-ring type cutter is employed cutting threads on an exterior conical surface. In Figs. 13, 14 and 15 the single-ring type cutter is employed to cut threads on an interior conical surface. In Figs. 12 and 13 the cutter axis is parallel to the work axis. In Figs. 14 and 15 the cutter axis is adjusted in a vertical plane to align the ring cutter with the helix angle of the thread being cut in a manner to be described.

Figure 18:
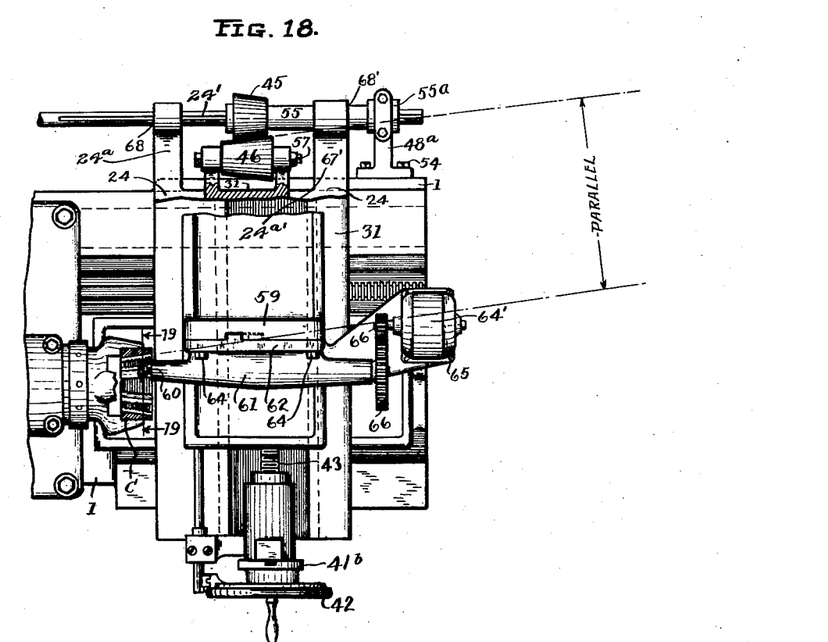
Fig. 18 is a view similar to Fig. 14 showing the adaptation of the invention to a cutting die with teeth having reliefs, using a single-ring type cutting tool, the control elements therein being similar to those shown in Fig. 8.
Figure 19:
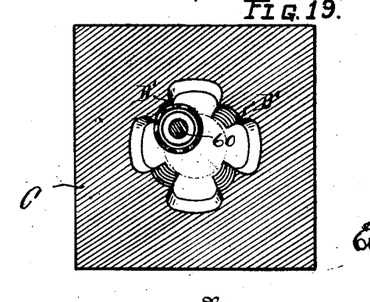
Fig. 19 is a section on the line 19—19 of Fig. 18.

In Figs. 18 and 19 the single-ring type cutter is employed to cut teeth on the internal conical surface of a thread cutting die and in this case the control elements 45 and 46 are constructed to control the tool to cut reliefs.

To adjust the position of the single-ring cutter to align it with the helix angle of the thread being cut, as may be desired when the thread has great pitch, the cutter may be adjustably revolved around a suitable one of its diameters as an axis, which, in the form of construction shown and described, is a horizontal diameter. For this purpose the following arrangement may be provided, referring particularly to Figs. 14, 15 and 18. On the auxiliary slide 33 is formed a wall 59.

The tool spindle 60 is mounted in suitable bearings 61 mounted on the side of a plate 62 adapted to be adjustably secured to the wall 59. 63 indicates pairs of elongated slots formed in the plate 62, each pair of slots being curved on an arc that is struck about the axis referred to. 64 indicates a plurality of bolts extending through the slots 63 and fitting screw threaded openings formed in the wall 59 and arranged so that the bolts will form guides for the walls of the slots 63, and when clamped, the bolts will operate to secure the plate 62 to the wall 59 in the desired position. The tool spindle 60 may be driven in any desired manner, but preferably by an electric motor 64' mounted on a base 65 carried by the plate 62 and connected by suitable reduction gearing 66 with the spindle 60.

It is necessary when a cylindrical multi-ring type cutter as shown in Figs. 11 and 17 is employed and in some cases when the single-ring type cutter is employed, to also adjustably position the axis of the tool to bring it into parallelism with the line of contact of the control elements and to this end the tool spindle may be mounted so that it may be adjustably swung in a horizontal plane and fixed in any adjusted position. It is not deemed necessary to show such a construction in the drawings since adjustments of this kind in general are well known in the art and a similar adjustment of the tool but in a vertical plane is shown and has just been described.

From the foregoing description, it will be seen that the control element 45 is supported by the shaft 24' and acts through the element 46 on the supplemental slide to move the latter transversely independently of the frame or bed. As the moving means 44 is arranged between the main slide 24 and supplemental slide 31, all of the mechanism for transversely moving the supplemental slide 31 in opposite directions, except the driving connection for the control element 45 through the shaft 24', is mounted on the main slide 24, so that the latter is free to be moved longitudinally of the bed by the lead screw 19. By providing two spaced arms 24a, 24a' on the slide 24, and disposing them at opposite sides of the control elements 45, 46, I prevent flexing or distortion of the shaft 24' and prevent relative displacement of the shaft 24' with respect to the slide 24, thus insuring positive accurate movement of the control element 46 and accurate cutting relation between the tool and work at all times. As the arms 24a, 24a', are mounted on the slide 24, they move therewith and are maintained at opposite sides of the control elements as the cutting operation takes place.

From the foregoing description of the arrangement of the various parts, it will appear that the roller 45 may be considered as supported either on the sleeve 55 upon which it is directly mounted as shown in Figs. 1, 3 and 5, or as supported by the shaft 24' which supports the sleeve 55. Furthermore, there is provided what may be called a slide bearing connection between the carriage and this support of the second roller, i. e. to say, when the carriage 24 moves (in the longitudinal direction of the shaft 24') the bearings 68, 69, 68' and 69' which move with the carriage by being carried at the outer ends of the arms 24a and 24a' on the carriage slide longitudinally on the shaft 24' and sleeve 55; this slide bearing connection with the shaft 24' being had directly between the carriage and the shaft 24' with respect to the bearing 68, 69 and being between the carriage and the shaft 24' through the sleeve 55 with respect to the bearing 68' and 69'.

Furthermore, it will appear that the force exerted by the spring 44c reacting between the abutment 44b on the carriage 24 and a thrust member 44a on the slide and which thus presses the roller 46 against the roller 45 tends to push the roller 45 away from the carriage 24. It is important that the roller 45 be maintained at a constant distance from the carriage 24 and that it resist this tendency to move away from the carriage and to insure this constant distance, the support of the roller 45, shaft 24' and sleeve 55 above referred to, is tied rigidly to the carriage by the arms 24a and 24a' and the bearings therein. Thus the spring 44c sets up a force in one direction on the carriage directly and in the other direction a force which is transmitted to the roller 45 and thence is transmitted through the support of the roller 45, just mentioned, back to the carriage, and in order that the carriage may move longitudinally and the distance between the roller 45 and the carriage 24 maintained constant notwithstanding, the connection between the carriage and the support of the roller 45 must obviously be a slide bearing connection as above referred to.

During the movement of the slide 24, and because of the angular line of contact between the rollers 45 and 46, the slide 31 moves on the carriage 24 in response to the pressure of the spring 44c keeping the roller 46 in pressure contact with the roller 45; in other words upon longitudinal movement of the carriage 24, due to the conical shape of the rollers, the carriage 31 becomes movable or free to move upon the carriage 24 and the spring 44c moves it to keep the rollers in contact.

From the foregoing description it will also be seen that I provide a relatively simple form of construction in which tapered bodies may be readily cut. By providing a pair of removable tapered control elements to guide the tool, various shapes and sizes of work pieces can be operated upon. Furthermore, since each control element may be made to a predetermined size and shape, uniformity and accuracy in the resulting product may be maintained in a ready manner.

Where the work-piece consists of a body having a conical external or internal wall in which threads are to be cut, the control elements will co-act to move the tool along the desired conical direction; but where the work-piece comprises a hob, cutter, die or tap, one of the operating elements is provided with a cam and such cam shaped element is driven in harmony with the work-piece so that the latter will be cut with reliefs.

To those skilled in the art to which my invention relates, many changes in construction and widely differing embodiments and applications of the invention will suggest themselves without departing from the spirit and scope thereof. My disclosures and the description herein are purely illustrative and are not intended to be in any sense limiting.

What I claim is:

1. In a machine of the class described, a work spindle adapted to support a work piece, a thread milling tool, means for moving the tool and work piece relatively to each other, means for guiding the relative movement along a general direction oblique to the axis of the work spindle to cause the tool to engage the work piece on a cone shaped portion thereof, said means comprising a pair of tapered rollers arranged with their axes parallel to the axis of the work spindle, one adapted to roll upon and move longitudinally relatively to the other.

2. In a machine of the class described, a work spindle adapted to support a work piece, a thread milling tool, means for moving the tool and work piece relatively to each other, means for guiding the relative movement along a general direction oblique to the axis of the work spindle to cause the tool to engage the work piece on a cone shaped portion thereof, said means comprising a pair of tapered rollers arranged with their axes parallel to the axis of the work spindle, one adapted to roll upon and move longitudinally relatively to the other on a line of contact therewith paralled to the said oblique direction of movement of the tool.

3. In a machine of the class described, a work spindle adapted to support a work piece, a tool, means for moving the tool and work piece relatively to each other, means for guiding the relative movement along a general direction oblique to the axis of the work spindle to cause the tool to engage the work piece on a cone shaped portion thereof, said means comprising a pair of rollers one of which is adapted to roll upon the other, and one of said rollers being shaped to have a non-circular profile on a cross section at right angles to its rotational axis whereby the tool is periodically moved out of said oblique direction of movement of the tool.

4. In a machine of the class described, a work spindle adapted to support a work piece, a tool, means for moving the tool and work piece relatively to each other, means for guiding the relative movement along a general direction oblique to the axis of the work spindle to cause the tool to engage the work piece on a cone shaped portion thereof, said means comprising a pair of rollers, one of which is adapted to roll upon and move longitudinally relatively to the other, and one of said rollers being shaped to have a non-circular profile on a cross section at right angles to its rotational axis whereby the tool is periodically moved out of said oblique direction of movement of the tool.

5. In a machine of the class described, a work spindle adapted to support a work piece, a tool, means for moving the tool and work piece relatively to each other, means for guiding the relative movement along a general direction oblique to the axis of the work spindle to cause the tool to engage the work piece on a cone shaped portion thereof, said means comprising a pair of rollers, one of which is adapted to roll upon and move longitudinally relatively to the other on a line of contact therewith parallel to the said oblique general direction of movement of the tool, and one of said rollers being shaped to have a non-circular profile on a cross section at right angles to its rotational axis whereby the tool is periodically moved out of said oblique direction of movement of the tool.

6. In a machine of the class described, a work spindle adapted to support a work piece, a tool, means for moving the tool and work piece relatively to each other, means for guiding the relative movement along a general direction oblique to the axis of the work spindle to cause the tool to engage the work piece on a cone shaped portion thereof, said means comprising a pair of tapered rollers arranged with their axes parallel to the axis of the work spindle, one adapted to roll upon and move longitudinally relatively to the other on a line of contact therewith parallel to the said oblique direction of movement of the tool, and one of said rollers being shaped to have a non-circular profile on a cross section at right angles to its rotational axis whereby the tool is periodically moved out of said oblique direction of movement of the tool.

7. In a machine of the class described, the combination of a bed having ways, a main slide mounted in said ways, a spindle, a pair of shafts arranged parallel to said spindle, means for driving said spindle and each of said shafts, a connection between one of said shafts and said slide, whereby the latter is moved to give it lead movement, a supplemental slide mounted on said main slide to move transversely of said bed, a tool spindle mounted on said supplemental slide, a conical element carried by the other shaft, and a second conical element rotatably mounted on said supplemental slide on an axis parallel to the shaft for the first mentioned conical element and arranged to co-act therewith to effect transverse slide movement of said supplemental slide during lead movement of said first mentioned slide.

8. In a machine of the class described, the combination of a bed having ways, a slide mounted in said ways, a work spindle, a shaft operatively connected with said slide to give it lead movement in said ways, a separate shaft, means for driving said spindle and each of said shafts in co-operative relation, a supplemental slide mounted on said slide to move transversely of said bed, a tool spindle mounted on said supplemental slide, a conical element carried by said supplemental slide, a conical element driven by said separate shaft and arranged to co-act with said first mentioned element to effect transverse movement of said supplemental slide in one direction during lead movement of said slide, said driven element being mounted for adjustment along said separate shaft.

9. In a machine of the class described, the combination of a bed having ways, a slide mounted in said ways, a work spindle, a shaft operatively connected with said slide to give it lead movement in said ways, a separate shaft, means for driving said spindle and each of said shafts in co-operative relation, a supplemental slide mounted on said slide and movable thereon transversely of said bed, a tool spindle mounted on said supplemental slide, a conical element carried by said supplemental slide, and a conical element driven by said separate shaft and co-acting with said first mentioned element to move said supplemental slide in one direction during lead movement of said slide, said last mentioned conical element having a longitudinally extending cam portion acting through the first mentioned element to cause the work to be cut with reliefs.

10. In a machine of the class described, the combination of a bed having ways, a main slide mounted in said ways, a work spindle, a shaft operatively connected with said main slide to give it lead movement in said ways, driving connections between said spindle and said shaft, a supplemental slide mounted on said main slide and movable thereon transversely of said bed, a tool spindle mounted on said supplemental slide, and means for actuating said supplemental slide, said means comprising a pair of elements co-acting to move the tool in a plane corresponding to the taper of the work and transversely during such movement to cause reliefs to be cut in the work, and means for driving one of said elements.

11. In a machine of the class described, the combination of a bed, a main slide mounted on said bed to move longitudinally thereof, a supplemental slide carried by said main slide to move transversely relative to said bed, a pair of arms extending from said main slide, a shaft supported by said arms, a conical element having driving connection with and supported by said shaft between said arms, a shaft operatively connected with said main slide to give it lead movement, a tool spindle carried by said supplemental slide, a work spindle, means for driving said work spindle and shafts, and a control element rotatably mounted on said supplemental slide in rolling contact with said conical element, whereby relative bodily movement between them effects transverse movement of said supplemental slide.

12. In a machine of the class described, the combination of a bed, a main slide mounted on said bed to move longitudinally thereof, a supplemental slide mounted on said main slide to move transversely of said bed, a pair of shafts extending longitudinally of said bed, one thereof being operatively connected with said main slide to give it lead movement, a tool spindle carried by said supplemental slide, a work spindle, means for driving said work spindle and shafts, a pair of co-acting elements carried by said supplemental slide and said other shaft for moving said supplemental slide in one direction, and a pair of arms extending from said main slide and provided with bearings in which said last mentioned shaft rotates while said arms move relative to said shaft during lead movement of said slide, whereby the shaft is held against misalignment due to operation of said co-acting elements.

13. In a machine of the class described, the combination of a bed having ways, a main slide mounted in said ways, a work spindle, a shaft operatively connected with said main slide to give it lead movement in said ways, a separate shaft, means for driving said spindle and each of said shafts, a supplemental slide mounted on said main slide and movable thereon transversely of said bed, a tool spindle, a rotary cutting tool on the tool spindle, means for supporting said tool spindle on said supplemental slide to swivel about an axis which is a diameter of the circular path of the tool, and means for actuating said supplemental slide, said means comprising a pair of elements, one of which is driven by said separate shaft, co-acting to move the tool in a line corresponding to the taper of the work engaged by the tool and transversely during such movement to cut reliefs in the work.

14. In a machine of the class described, the combination of a bed having ways, a main slide mounted in said ways, a work spindle, a shaft operatively connected with said main slide to give it lead movement in said ways, driving connection between said spindle and said shaft, a supplemental slide mounted on said main slide and movable thereon transversely of said bed, a tool spindle, a rotary cutting tool on the tool spindle, a pair of elements carried by said supplemental slide and bed, respectively, and co-acting to move said supplemental slide in one direction during lead movement of said main slide, means for supporting said tool spindle on said supplemental slide to swivel about an axis which is a diameter of the circular path of the tool, and means movable with said tool spindle for driving it.

15. In a machine of the class described, the combination of a bed having ways, a main slide mounted in said ways, a work spindle, a shaft operatively connected with said main slide to give it lead movement in said ways, a supplemental slide mounted on said main slide to move transversely of said bed, a tool spindle mounted on said supplemental slide, and means acting on said supplemental slide during lead movement of said main slide for moving the tool along a line corresponding to the taper of the work and for intermittently reciprocating the same transversely.

16. In a machine of the class described, the combination of a bed having ways, a main slide mounted in said ways, a work spindle, a shaft operatively connected with said main slide to give it lead movement in said ways, a supplemental slide mounted on said main slide to move transversely of said bed, a tool spindle mounted on said supplemental slide, and means acting on said supplemental slide during lead movement of said main slide for moving the tool along a line corresponding to the taper of the work and for intermittently reciprocating the same transversely a predetermined number of times for each revolution of said work spindle.

17. In a machine of the class described, the combination of a bed having ways, a main slide mounted in said ways, a work spindle, a shaft operatively connected with said main slide to give it lead movement in said ways, a supplemental slide mounted on said main slide to move transversely of said bed, a tool spindle mounted on said supplemental slide, and means acting on said supplemental slide during lead movement of said main slide for moving the tool along a line corresponding to the taper of the work and for intermittently reciprocating the same transversely, said means comprising a separate shaft, a pair of co-acting elements, one driven by said separate shaft and the other mounted on said supplemental slide and one provided with a cam portion and means acting in opposition to the cam portion.

18. In a machine of the class described, the combination of a bed having ways, a main slide mounted in said ways, a work spindle, a shaft operatively connected with said main slide to give it lead movement in said ways, a separate shaft, driving connections between said spindle and each of said shafts, a supplemental slide mounted on said main slide and movable thereon transversely of said bed, a tool spindle, a rotary cutting tool on the tool spindle, means for supporting said tool spindle on said supplemental slide to swivel about an axis which is a diameter of the circular path of the tool, and means movable with said tool spindle for driving it.

19. In a machine of the class described, the combination of a bed having ways, a main slide mounted in said ways, a work spindle, a shaft operatively connected with said main slide to give it lead movement in said ways, a separate shaft, driving connections between said spindle and each of said shafts, a supplemental slide mounted on said main slide and movable thereon transversely of said bed, a tool spindle, a rotary cutting tool on the tool spindle, means for supporting said tool spindle on said supplemental slide to swivel about an axis which is a diameter of the circular path of the tool, and means for actuating said supplemental slide, said means including a pair of conical elements, one of which is driven by said separate shaft and one of which has a longitudinal cam portion, co-acting to move the tool in a line corresponding to the taper of the wall engaged by the tool and transversely during such movement to cut reliefs in the work.

19. In a machine of the class described, the combination of a bed having ways, a main slide mounted in said ways, a work spindle, a shaft operatively connected with said main slide to give it lead movement in said ways, a separate shaft, driving connections between said spindle and each of said shafts, a supplemental slide mounted on said main slide and movable thereon transversely relative to said bed, a tool spindle, a rotary cutting tool on the tool spindle, means for supporting said tool spindle on said supplemental slide to swivel about an axis which is a diameter of the circular path of the tool, and means for actuating said supplemental slide, said means including a pair of elements, one of which is driven by said separate shaft and provided with a longitudinal cam portion, co-acting to move the tool in one direction in a line corresponding to the taper of the wall engaged by the tool and transversely during such movement to cut reliefs in the work, and means normally tending to move said supplemental slide in the opposite direction.

20. In a machine of the class described, a main frame, a rotatable work spindle on the frame adapted to support a work piece, a tool movably mounted with respect to the frame, means for setting up relative lead movement between the tool and work piece, means for guiding the lead movement along a lead line in a direction to cause the tool to work the work piece on a generally cone shaped portion thereof, said guiding means comprising a pair of rotatable rollers, one of which is associated with the tool and movable bodily therewith and the other of which is associated with the frame, the rollers being adapted to roll upon each other and the first mentioned roller being adapted to move relatively axially on the other roller on a line of contact therewith parallel to said lead line, and one of said rollers being shaped to have a non-circular profile on a cross section at right angles to its rotational axis whereby the tool is periodically moved out of said direction of lead.

21. In a machine of the class described, a main frame, a rotatable work spindle on the frame adapted to support a work piece, a tool, a tool support movable with respect to the frame with a lead movement relative to the work piece, means for moving the tool support, means for guiding the lead movement along a lead line in a direction to cause the tool to work the work piece on a generally cone shaped portion thereof, said guiding means comprising a pair of rollers one of which is rotatably mounted on the tool support and movable therewith and the other of which is rotatably mounted on the frame, the rollers being adapted to roll upon each other and the roller on the support being adapted to move relatively axially on the roller on the frame on a line of contact therewith parallel to said lead line, and one of said rollers being shaped to have a non-circular profile on a cross section at right angles to its rotational axis whereby the tool is periodically moved out of said direction of lead.

22. In a machine of the class described, a main frame, a rotatable work spindle on the frame adapted to support a work piece, a tool, a main tool support movable on the frame in the direction of the work spindle axis, a supplemental tool support on the main support movable at an angle to said axis, means for moving the main tool support on the frame and means for concurrently moving the supplemental support on the main support, to give a lead movement to the tool relative to the work piece, means for guiding the lead movement along a lead line the general direction of which is at an angle to the work axis to cause the tool to work the work piece on a generally cone shaped portion thereof, said guiding means comprising a pair of rotatable rollers one of which is adapted to roll upon and move longitudinally relatively to the other on a line of contact therewith parallel to the said lead line, one of said rollers being rotatably mounted on the supplemental tool support and movable therewith and the other roller being rotatably mounted on the frame.

23. In a machine of the class described, a main frame, a rotatable work spindle on the frame adapted to support a work piece, a tool, a main tool support movable on the frame in the direction of the work spindle axis, a supplemental tool support on the main support movable at an angle to said axis, means for moving the main tool support on the frame and means for concurrently moving the supplemental support on the main support, to give a lead movement to the tool relative to the work piece, means for guiding the lead movement along a lead line the general direction of which is at an angle to the work axis to cause the tool to work the work piece on a generally cone shaped portion thereof, said guiding means comprising a pair of rotatable rollers one of which is tapered and one of which is adapted to roll upon and move longitudinally relatively to the other on a line of contact therewith parallel to the said lead line, one of said rollers being rotatably mounted on the supplemental tool support and movable therewith and the other roller being rotatably mounted on the frame.

24. In a machine of the class described, a main frame, a rotatable work spindle on the frame adapted to support a work piece, a tool, a main tool support movable on the frame in the direction of the work spindle axis, a supplemental tool support on the main support movable at an angle to said axis, means for moving the main tool support on the frame and means for concurrently moving the supplemental support on the main support, to give a lead movement to the tool relative to the work piece, means for guiding the lead movement along a lead line the general direction of which is at an angle to the work axis to cause the tool to work the work piece on a generally cone shaped portion thereof, said guiding means comprising a pair of tapered rollers one of which is adapted to roll upon and move longitudinally relatively to the other on a line of contact therewith parallel to the said lead line, one of said rollers being rotatably mounted on the supplemental tool support and movable therewith and the other being rotatably mounted on the frame, and their rotational axes being parallel to the direction of movement of the main tool support on the frame.

25. In a machine of the class described, a main frame, a carriage mounted for longitudinal movement on the frame, means for moving the carriage, a tool supporting structure on the carriage movable therewith and movable thereon, a first roller rotatably mounted on the tool supporting structure, a second rotatable roller, a generally longitudinally disposed support on the frame for the second roller, means associated with the carriage for exerting force to hold the first roller in pressure contact against the second roller, the rollers being adapted to roll one upon the other and adapted to move relatively axially on a line of mutual contact upon movement of the carriage, and a slide bearing connection between the carriage and the said support of the second roller, through which, during movement of the carriage, the force on the second roller due to the said pressure contact of the first roller thereupon may be transmitted to the carriage.

26. In a machine of the class described, a main frame, a carriage mounted for longitudinal movement on the frame, means for moving the carriage, a tool supporting structure on the carriage movable therewith in one direction and movable thereon in another direction, a first roller rotatably mounted on the tool supporting structure and movable bodily therewith, a second rotatable roller, a generally longitudinally disposed support therefor on the frame, the rollers being arranged for rolling one upon the other and for relative axial movement on a line of mutual contact, means on the carriage for causing the first roller to be held against the second roller with pressure and a slide bearing connection between the carriage and the said support of the second roller, through which, during movement of the carriage, the respective reactions of the first roller and the second roller due to the said pressure may be transmitted to the carriage.

27. In a machine of the class described, a main frame, a work spindle on the frame, ways on the frame in the general direction of the work spindle axis, a movable carriage on the ways, means for moving the carriage, a tool supporting structure on the carriage movable therewith and movable thereon in a direction at an angle to the work spindle axis, whereby the tool may be given a lead movement in an oblique direction to the axis of the work spindle, means for guiding the direction of said lead movement comprising a first roller rotatably mounted on the tool supporting structure and movable bodily therewith, a second rotatable roller supported on the frame, resilient means on the carriage acting upon the tool supporting structure for holding the first roller in pressure contact with the second roller, the rollers being adapted to roll upon each other and, upon movement of the carriage, adapted to move relatively axially on a line of mutual contact parallel to the said oblique direction of the lead, and a slide bearing connection between the carriage and the said support of the second roller, through which during movement of the carriage, the reaction of the second roller due to the pressure of the first roller may be transmitted to the carriage.

28. In a machine of the class described, a main frame, a work spindle on the frame adapted to support a work piece, a tool on the frame, means for setting up relative lead movement between the tool and work piece, means for guiding the lead movement along a rectilinear lead line the general direction of which is at an angle to the spindle axis and intersects it, said guiding means comprising a pair of rotatable rollers mounted on rotational axes which lie in a plane parallel to the plane of said lead line and work spindle axis, the rollers being adapted to roll upon each other and to move relatively axially on a line of mutual contact parallel to the said lead line, and one of said rollers being shaped to have a non-circular profile in a plane at right angles to its rotational axis whereby the tool is periodically moved out of and returned to said lead line of movement.

29. In a machine of the class described, a main frame, a rotatable work spindle on the frame adapted to support a work piece, a tool, a main tool support movable on the frame in the direction of the work spindle axis, a supplemental tool support on the main support movable at an angle to said axis, means for moving the main tool support on the frame and means for concurrently moving the supplemental support on the main support, to give a lead movement to the tool relative to the work piece, means for guiding the lead movement along a rectilinear lead line the general direction of which is at an angle to the work axis to cause the tool to work the work piece on a generally cone shaped portion thereof, said guiding means comprising a pair of rotatable rollers one of which is adapted to roll upon and move longitudinally relatively to the other on a line of contact therewith parallel to the said lead line, one of said rollers being rotatably mounted on the supplemental tool support and movable therewith and the other roller being rotatably mounted on the frame, and one of said rollers being shaped to have a non-circular profile in a plane at right angles to its rotational axis whereby the tool is periodically moved out of and returned to said lead line of movement.

30. In a machine of the class described a main frame, a work spindle on the frame, ways on the frame in the direction of the work spindle axis, a movable carriage on the ways, means for moving the carriage, a tool supporting structure on the carriage movable therewith and movable thereon in a direction at an angle to the work spindle axis, whereby the tool may be given a lead movement in a rectilinear direction oblique to the axis of the work spindle, means for guiding the direction of said lead movement comprising a first roller rotatably mounted on the tool supporting structure and movable bodily therewith, a second rotatable roller supported on the frame, means on the carriage adapted to act upon the tool supporting structure to hold the first roller in pressure contact with the second roller, the rollers being adapted to roll upon each other and, upon movement of the carriage, to move relatively axially on a line of mutual contact parallel to the said direction of the lead movement, and one of the said rollers being shaped to have a non-circular profile in a plane at right angles to its rotational axis whereby the tool is periodically moved out of and returned to said lead line of movement, and a slide bearing connection between the carriage and the said support of the second roller, through which, during movement of the carriage, the reaction of the second roller due to the pressure of the first roller may be transmitted to the carriage.

31. In a machine of the class described, a main frame, a work spindle on the frame, ways on the frame in the direction of the work spindle axis, a movable carriage on the ways, means for moving the carriage, a tool support on the carriage movable therewith and movable thereon in a direction at an angle to the work spindle axis, whereby the tool may be given a lead movement in a direction oblique to the axis of the work spindle, means for guiding the direction of said lead movement comprising a first roller rotatably mounted on the tool support and movable bodily therewith, a second rotatable roller supported on the frame, means on the carriage acting upon the tool support to to hold the first roller in pressure contact with the second roller, the rollers being adapted to roll upon each other and, upon movement of the carriage, to move relatively axially on a line of mutual contact parallel to the said oblique direction of the lead, and a slide bearing connection between the carriage and the said support of the second roller, through which, during movement of the carriage, the reaction of the second roller due to the pressure of the first roller may be transmitted to the carriage.

32. In a machine of the class described, a main frame, a carriage mounted for longitudinal movement on the frame, means for moving the carriage, a pair of engageable reaction elements, one of which is a roller and one of the reaction elements being mounted on the carriage and the other being supported on the frame, means associated with the carriage for exerting force to hold the first mentioned element in pressure contact against the second element, the roller element being rotatable on an axis of rotation while in pressure engagement with the reaction element and the two elements being adapted to have relative bodily movement in the general direction of the roller axis, and a slide bearing connection between the carriage and the support of the second element through which, during movement of the carriage, the force on the second element due to the said pressure may be transmitted to the carriage.

33. In a machine of the class described, a main frame, a carriage mounted for longitudinal movement on the frame, means for moving the carriage, a tool supporting structure on the carriage movable therewith and movable thereon, a pair of engageable reaction elements, one of which is a roller, one of the reaction elements being mounted on the tool supporting structure and movable therewith, the other reaction element being supported on the frame, means associated with the carriage for exerting force to hold the first mentioned element in pressure contact with the second element, the roller being rotatable on an axis of rotation while in pressure engagement with the reaction element, and the two elements being adapted to have relative movement in the general longitudinal direction of the holler element upon movement of the carriage, and a slide bearing connection between the carriage and the support of the second element through which, during movement of the carriage, the force on the second element due to said pressure may be transmitted to the carriage.

34. In a machine of the class described, a main frame, a work spindle on the frame, ways on the frame in the general direction of the work spindle axis, a movable carriage on the ways, means for moving the carriage, a tool supporting structure on the carriage movable therewith and movable thereon in a direction at an angle to the work spindle axis, whereby the tool may be given a lead movement to cause the tool to work a work piece mounted on the work spindle on a generally conical portion thereof, means for guiding the direction of lead movement comprising a pair of reaction elements, one of which is a roller, one of the reaction elements being mounted on the tool supporting structure and movable bodily therewith and the other being supported on the frame, resilient means on the carriage acting on the tool supporting structure for holding the first reaction element in pressure contact with the second reaction element, the roller element being rotatable on an axis of rotation while in pressure engagement with the reaction element, and, upon movement of the carriage, the two reaction elements being adapted to have relative bodily movement in the direction of said lead movement and in the general direction of the roller axis and a slide bearing connection between the carriage and the said support of the said reaction element, through which, during movement of the carriage, the reaction of the second element due to the pressure of the first element thereon may be transmitted to the carriage.

35. In a machine of the class described, a main frame, a work spindle on the frame adapted to support a work piece, a tool on the frame, means for setting up relative lead movement between the tool and work piece, means for guiding the lead movement on a lead line in the direction to cause the tool to work the work piece on a generally cone-shaped portion thereof, said means comprising a pair of rotatable rollers, one of which is tapered, mounted on rotational axes, the rollers being adapted to roll upon each other and to have relative bodily movement in the general direction of their axes and on a line of mutual contact in the direction of said lead line, and one of said rollers being shaped to have a non-circular profile on a plane at an angle to its rotational axis, whereby the said lead movement is adapted to be diverted from and returned to said direction of lead.

36. In a machine of the class described, a main frame, a carriage mounted for longitudinal movement on the frame, means for moving the carriage, a pair of rotatable rollers mounted on rotational axes, one of which is mounted on the carriage and the other supported on the frame, means associated with the carriage for exerting force to hold the rollers in pressure contact with each other, and the two rollers being adapted to have relative bodily movement in the general direction of their axes, and a slide bearing connection between the carriage and the said support of one of the rollers through which, during movement of the carriage, the force on the supported roller due to said pressure may be transmitted to the carriage.

37. In a machine of the class described, a main frame, a work spindle on the frame adapted to support a work piece, a thread milling tool on the frame, means for setting up relative lead movement between the tool and work piece, means for guiding the lead movement along a rectilinear lead line intersecting the spindle axis, said guiding means comprising a pair of rollers, the axes of the rollers lying in a plane parallel to that defined by the lead line and work spindle axis.

38. In a machine of the class described, a main frame, a work spindle on the frame adapted to support a work piece, a thread milling tool on the frame, means for setting up relative lead movement between the tool and work piece, means for guiding the lead movement along a lead line intersecting the spindle axis, said guiding means comprising a pair of rotatable rollers one of which is conical, the axes of the rollers lying in a plane parallel to the plane defined by the lead line and work spindle axis.

39. In a machine of the class described, a main frame, a rotatable work spindle on the frame adapted to support a work piece, a thread milling tool movably mounted with respect to the frame, means for setting up relative lead movement between the tool and work piece, means for guiding the lead movement along a lead line in a direction to cause the tool to follow a substantially frustro-conical path on the work piece, said guiding means comprising a pair of rollers one of which is associated with the tool and the other of which is associated with the frame, the rollers being adapted to roll upon each other and to move axially upon each other along a line parallel to said lead line.

40. In a machine of the class described, a main frame, a rotatable work spindle on the frame adapted to support a work piece, a thread milling tool movably mounted with respect to the frame, means for setting up relative lead movement between the tool and work piece, means for guiding the lead movement along a lead line in a direction to cause the tool to traverse a substantially cone-shaped area on the work piece, said guiding means comprising a pair of rollers one of which is tapered, one of the rollers being associated with the tool and movable therewith, and the other associated with the frame, the rollers being adapted to roll upon each other and to slide axially upon each other.

41. In a machine of the class described, a main frame, a rotatable work spindle on the frame adapted to support a work piece, a thread milling tool movably mounted with respect to the frame, means for setting up relative lead movement between the tool and work piece, means for guiding the lead movement along a lead line in a direction to cause the tool to follow a substantially conical path on the work piece, said guiding means comprising a pair of rollers one of which is rotatably mounted on the tool support and movable therewith and the other of which is rotatably mounted on the frame, the rollers being arranged to roll upon each other and to slide axially upon each other on a line of contact parallel to said lead line.

42. In a machine of the class described, a main frame, a rotatable work spindle on the frame adapted to support a work piece, a tool support movable with respect to the frame, means for setting up relative lead movement between the work and tool piece, means for guiding the lead movement along a lead line in a direction to cause the tool to traverse a substantially conical area on the work piece, said guiding means comprising a pair of rollers one of which is tapered, one of the rollers being rotatably mounted on the tool support and movable therewith and the other being rotatably mounted on the frame, and positive driving connections between one of said rollers and the spindle, the last mentioned roller being non-circular in cross-section.

43. In a machine of the class described, a main frame, a work spindle journalled thereon, a tool supported by the frame, lead means for producing relative lead movement between the tool and work spindle, means for guiding the lead movement along a lead line a predetermined direction, said guiding means comprising a tapered roller and a reaction element, the roller being non-circular and rotatable in engagement with the reaction element, and the roller and reaction element being adapted to move relatively to each other in the direction of said lead line.

44. In a machine of the class described, a main frame, a work spindle journalled on the frame and arranged to support a work piece, a tool carried by the frame, lead means for moving the tool relative the work piece, means for guiding the lead movement along a predetermined lead line, the guiding means comprising a tapered roller of non-circular cross-section and a reaction element in engagement therewith, the roller being arranged to move during the lead movement along the reaction element in the direction of the lead line and in general in the direction of the axis of rotation of the roller.

45. In a machine tool having a rotatable work spindle and a support therefor and a tool support movable axially and radially relative thereto, feeding mechanism comprising an abutment held in a fixed relation to one of said supports, a tapered cam of non-circular cross-section journalled on the other element, and positive driving connections between said spindle and said cam.

46. In a machine tool having a rotatable work spindle and a tool spindle movable axially and radially relative thereto, supports for said spindles, a feeding mechanism comprising two coacting rolls, one carried by each support, one of the rolls being non-circular in cross-section and of varying cross-sectional area, and positive gearing between said roll and the work spindle.

47. In a machine tool having a rotatable work spindle and a tool spindle movable axially and radially relative thereto, supports for said spindles, a feeding mechanism comprising two coacting rolls, one carried by each support, one of the rolls being non-circular in cross-section and the other roll being of varying cross-section, and positive driving connections between the first mentioned roll and the spindle.

In testimony whereof, I have hereunto signed my name.

ERNEST J. LEES.